United States Patent [19]

Miller

[11] 4,291,724
[45] Sep. 29, 1981

[54] FLOWLINE SWITCHING APPARATUS

[75] Inventor: Henry W. Miller, Houston, Tex.

[73] Assignee: Cameron Iron Works, Inc., Houston, Tex.

[21] Appl. No.: 162,575

[22] Filed: Jun. 24, 1980

[51] Int. Cl.³ .................. B65G 11/00; E21B 23/12; E21B 33/05; F16K 11/00
[52] U.S. Cl. ...................... 137/555; 137/625.46; 137/874; 137/876; 166/70; 166/366
[58] Field of Search ............... 166/70, 85, 75 R; 137/874, 876, 551, 553, 555, 625.46; 251/58; 15/104.06 R, 104.06 A; 193/23

[56] References Cited

U.S. PATENT DOCUMENTS

| | | | |
|---|---|---|---|
| 3,396,789 | 8/1968 | Dean | 166/153 X |
| 3,542,125 | 11/1970 | Sizer | 166/366 X |
| 3,545,474 | 12/1970 | Brown | 166/70 X |
| 3,545,489 | 12/1970 | Brown | 137/876 |
| 3,674,123 | 7/1972 | Lewis et al. | 193/23 |
| 3,780,756 | 12/1973 | Pennington | 137/874 X |
| 3,877,520 | 4/1975 | Putnam | 166/75 X |
| 4,133,418 | 1/1979 | Van Bilderbeek | 166/153 X |
| 4,223,700 | 9/1980 | Jones | 137/876 X |

Primary Examiner—Stephen J. Novosad
Attorney, Agent, or Firm—Vinson & Elkins

[57] ABSTRACT

A flowline switching apparatus having a tubular housing with end closures and a drum rotatably mounted therein with a passage through the drum aligned with a port in one end closure and positioned to sequentially align with each of a plurality of ports in the other end closure as said drum is rotated, a power cylinder connected to said housing and having a plunger with a ratchet pawl for rotating said drum, a second power cylinder connected to said housing with a plunger adapted to engage sequentially in recesses in the exterior of said drum to lock the drum in preselected positions of passage-port alignment, a third power cylinder connected to the housing with a plunger adapted to engage sequentially in recesses of varying depth on the exterior of said drum to indicate the position of the drum and means balancing fluid pressure between the interior and exterior and between opposite ends of said drum.

11 Claims, 7 Drawing Figures

FLOWLINE SWITCHING APPARATUS

BACKGROUND

The present invention relates to an improved flowline switching apparatus and particularly to an improved flowline switching apparatus for directing through flow line (TFL) tools to one of a plurality of well strings from a single source. Such switching apparatus is used primarily underwater for connections to underwater oil and gas wells and is remotely controlled.

The G. E. Lewis et al U.S. Pat. No. 3,674,123 illustrates a prior flowline switching apparatus having a frusto-conical rotor in a frusto-conical housing with a tubular passage through the rotor communicating from a single upper port to selected ones of a plurality of lower ports. The base of the rotor has a single recess which is adapted to be engaged by one of a plurality of actuator plungers to lock it in a preselected position and a reed switch is associated with each plunger to indicate the locked positioning of the plunger in the recess.

The P. S. Putnam U.S. Pat. No. 3,877,520 discloses a conical housing and a tube connecting from the top central port to a lower rotary plate. The plate is rotated by a hydraulic motor to position the lower end of the tube in alignment with one of two ports. A fluid actuated stab-in connector is positioned at the lower end of the tube to make a positive connection to the lower port.

The P. S. Sizer U.S. Pat. No. 3,542,125 discloses a rotary selector for submerged wellheads. Rotation is accomplished with power cylinders having ratchet connections to teeth on a ratchet wheel and a pinion drive is used to provide an indication of the position of the pivoting arm.

Other patents of interest include the J. T. Dean U.S. Pat. No. 3,396,789 which discloses a rotary TFL tool holder with microswitches to indicate the holder position and the B. H. Van Bilderauk U.S. Pat. No. 4,133,418 which discloses a flowline selector with a rotatable plate rotating a tube to provide different connections, the rotations being produced by vertical movement of a piston converted to rotation by the interaction of a cam and cam follower.

Such devices are generally used in subsea locations where remote rotation, locking and position indication are generally required by the operator of the well.

None of the prior art suggests the improved features of the present invention for balancing, locking, sealing and indicating.

There is no teaching of the use of a single position locking device nor of a single indicating device to provide indication of one of multiple positions.

SUMMARY

The present invention is an improved flowline switching apparatus with a rotating drum within a housing having one port at one end and a plurality of ports at the other end and a passage through the drum to provide communication from the one port to selected ones of the ports at the other end. It includes a first power cylinder and ratchet wheel for rotating the drum; a second power cylinder and plunger engaging sequentially in one of a plurality of recesses in the drum exterior to lock the drum in its desired location; and a third power cylinder and plunger engaging sequentially in recesses in the drum exterior of varying depth to indicate the port of the plurality of ports with which the drum passage is in alignment. Pressure balancing is provided between the interior of the drum and its exterior and also between opposite ends of the drum to minimize bearing loads.

An object of the present invention is to provide an improved flowline switching apparatus with simple and positive operating position locking and position indicating apparatus.

Another object is to provide an improved flowline switching apparatus having a pressure balanced rotating drum to minimize the bearing loads, to simplify its rotation and to minimize its maintenance.

A further object is to provide an improved flowline switching apparatus which is simple to operate, is reliable in operation and is relatively maintenance free.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENT

Figure 1:
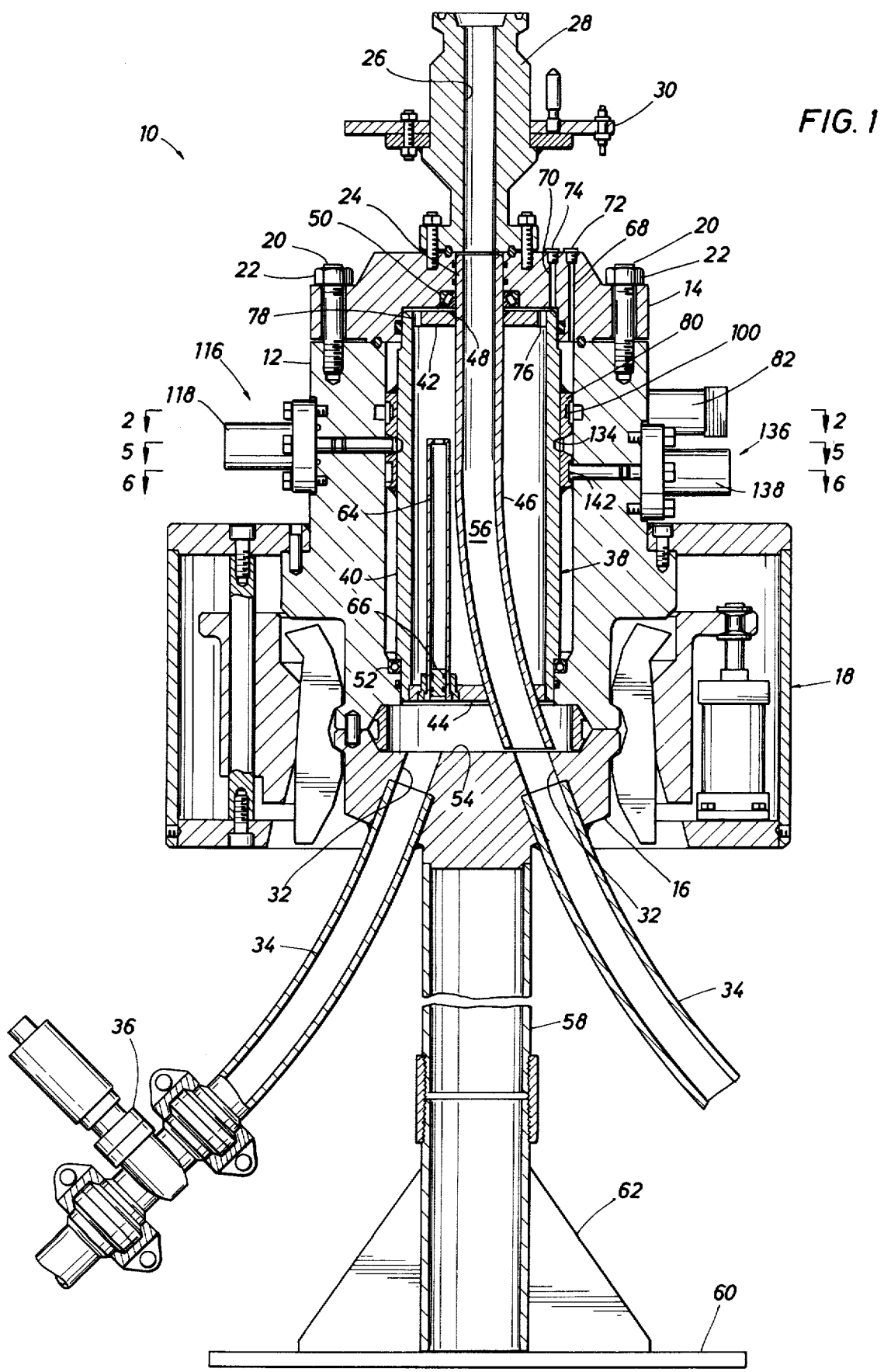
FIG. 1 is a vertical sectional view through the improved flowline switching apparatus of the present invention.

Improved flowline switching apparatus 10 as shown in FIG. 1 includes tubular housing 12 having upper end closure 14 and lower end closure 16 secured thereto. Remotely operating collet connector 18 secures lower end closure 16 to housing 12 and studs 20 and nuts 22 secure upper end closure 14 to housing 12. End closure 14 has port 24 therein in communication with the interior passage 26 through connecting spool 28 which is aligned with the axis of housing 12. Control receiver plate 30 is mounted on spool 28 to provide an anchoring structure for the control lines leading to switching apparatus 10. Lower end closure 16 includes ports 32 arranged in a circle about the axis of housing 12 with lines 34 extending through ports 32 in communication with the interior of housing 12 and outwardly beyond end closure 16 as shown in FIG. 1. Each of lines 34 includes remotely controlled safety valve 36 to close all of lines 34 which are not being used to prevent flow between such lines and avoid the need for seals around ports 32 as hereinafter explained.

Drum 38 is positioned within housing 12 for rotation about an axis coincident with the centerline of port 24. Drum 38 includes tubular body 40 with plates 42 and 44 secured to the ends of body 40 by welding or other suitable means. Tube 46 extends through and is secured in opening 48 in plate 42. The upper end of tube 46 is positioned within port 24 and suitably sealed for rotation therein. Thrust bearing 50 is mounted between tube 46 and the inside of upper end closure 14 and ball bearing 52 is positioned to support rotation of drum 38 near the lower end thereof and within the interior of housing 12. Suitable seals are provided between the upper and lower exterior of the drum and the interior of housing 12 as shown. Tube 46 extends from opening 48 through the interior of body 40 and through plate 44 at a position spaced from the axis of rotation of drum 38 and terminates in close spaced relationship to inner surface 54 of lower end closure 16. The lower end of tube 46 is tilted at an angle and, when drum 38 is rotated, the lower end of tube 46 comes into alignment with ports 32 and lines 34 so that a TFL tool easily passes therethrough. The curvature of tube 46 provides a passage 56 through drum 38 which is curved but smoothly and of sufficient radius (usually 60 inches or more) to allow TFL tools to be pumped therethrough.

The space between the lower end of tube 46 and surface 54 avoids the problems of attempting to maintain a seal therebetween. By-passing of fluids between ports 32 is avoided by remotely closing valves 36 on all lines 34 except the line being used. This provides a sealed system to avoid the flow of fluids into housing 12 and through port 32 and lines 34 not being used. Lines 34 are not used as return lines for the TFL pumping but other suitable lines (not shown) are provided so that the TFL tools may be pumped in both directions.

The apparatus 10 may be supported in any suitable manner, such as by the pipe 58 secured to closure 16 and supported from base 60 by brackets 62.

The space between the end of tube 46 and surface 54 exposes the bottom of housing 12 to the fluid pressure in tubes 46 and 34 which pressure is exerted on the lower side of the drum 38. A means is provided to balance the pressure between the exterior and interior of the drum 38 and between opposite ends of drum 38 to avoid excessive thrust loads on thrust bearing 50. Such means includes tube 64 extending through and secured in plate 44. Tube 64 extends a substantial distance into drum 38 as shown. Floating piston 66 is positioned within the tube 64 and is slidable therein responsive to pressure changes to balance the pressure between the exterior and interior of the drum 38. The space above, around and within drum 38 is filled with suitable liquid through fill ports 68 and 70 and plugs 72 and 74 close such ports. Ports 76 and 78 extend through drum plate 42 to allow complete filling of drum 38 and tube 64. When a higher pressure is encountered below drum 38, piston 66 moves upward in tube 64 until the pressure within and above drum 38 are the same as the pressure below drum 38. It is suggested that care be taken to eliminate air from the liquid in and above drum 38. Sleeve 80 is secured to and around the exterior of drum 38 as shown.

Means are provided for rotating drum 38, for locking it in its desired positions and for indicating its position.

Figure 2:
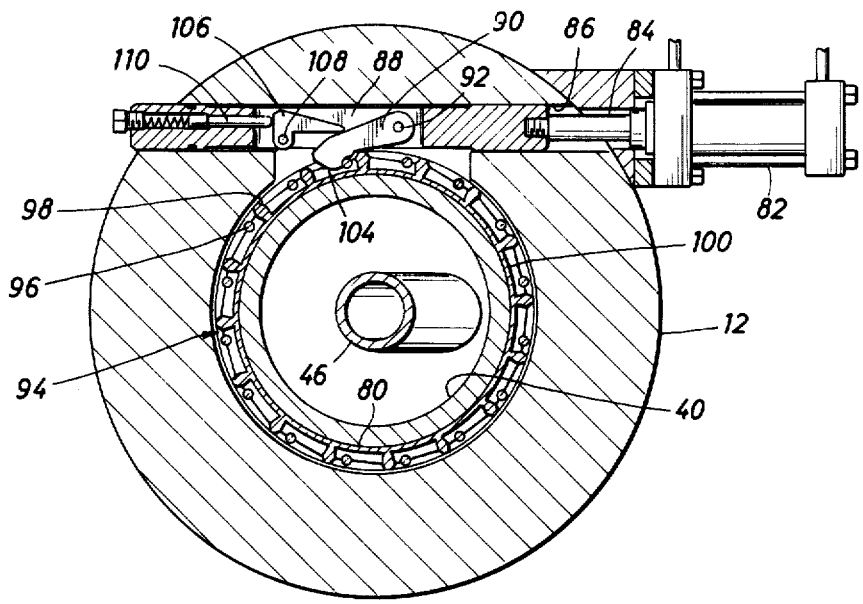
FIG. 2 is a sectional view of the drum rotating mechanism taken along line 2—2 in FIG. 1.
Figure 3:
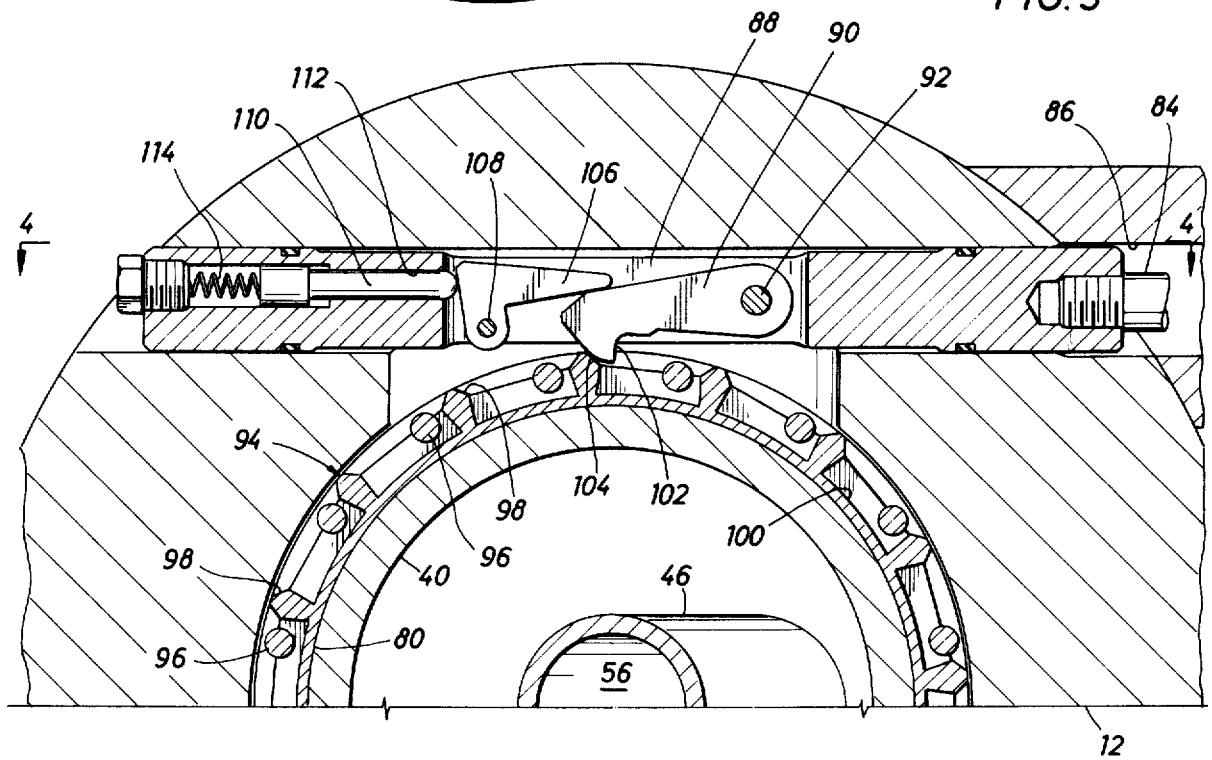
FIG. 3 is a sectional view similar to FIG. 2 showing the return stroke of the rotating mechanism.
Figure 4:
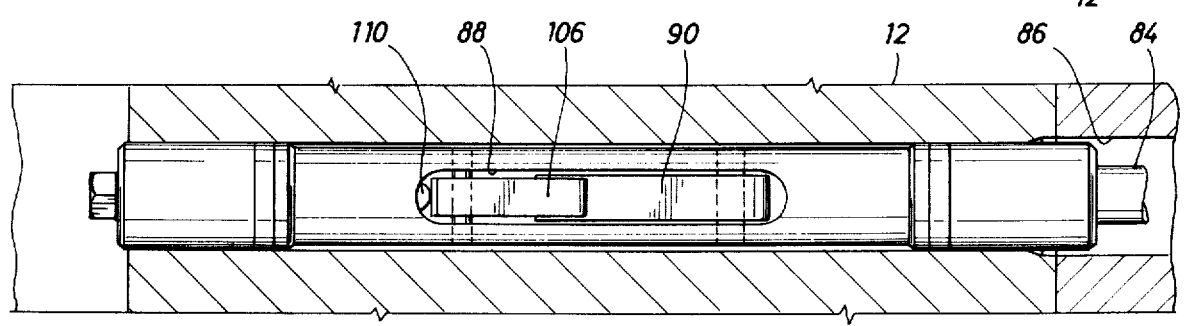
FIG. 4 is a sectional view of the rotating mechanism plunger taken along line 4—4 in FIG. 3.

The means for rotating drum 38 includes power cylinder 82 mounted on housing 12 as best seen in FIGS. 2 and 3 and includes piston rod 84 extending therefrom through the opening 86 in housing 12 which is generally tangential to sleeve 80. The end of piston rod 84 is enlarged, is sealed in the opening at both ends and has a central slot 88 in which detent 90 is pivotally mounted on pin 92 as shown in FIGS. 3 and 4. Detent 90 coacts with ratchet wheel 94 which includes pins 96 and cams 98 spanning groove 100 around the exterior of sleeve 80. Detent 90 has a curved portion 102 engaging pins 96 and a tapered portion 104 which engages cams 98 on the return stroke of piston rod 84 to cam detent 90 out of engagement with ratchet wheel 92. Lever 106, pivotally mounted in slot 88 by pin 108, is urged in a clockwise direction about pin 108 and engages detent 90 to urge it into engagement with ratchet wheel 94. Plunger 110 biases lever 106 as described and slides in the bore 112 in the outer end of the enlarged portion piston rod 84 and is urged toward lever 106 by spring 114.

With this structure, each stroke of piston rod 84 results in a preselected rotation of drum 38. With 16 equally spaced pins 96, each stroke results in a rotation of 22½° of drum 38. The return stroke or extension of piston rod 84 is illustrated in FIG. 3 with the detent 90 being cammed outwardly and returning to engage the next of pins 96.

Figure 5:
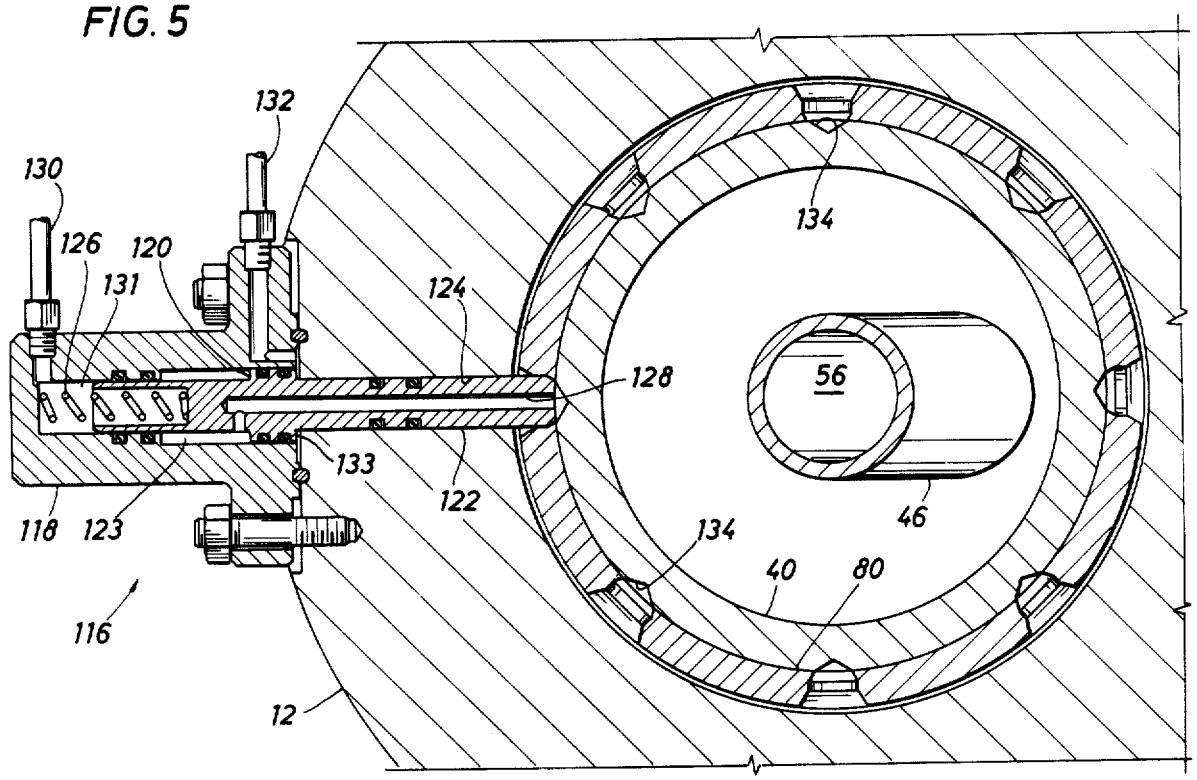
FIG. 5 is a detailed sectional view of the position locking device taken along line 5—5 in FIG. 1.

Locating or locking means 116 is best shown in FIG. 5. It includes power cylinder 118 secured to housing 12 with piston 120 positioned therein and plunger 122 extending through opening 124 in housing 12 with suitable seals therebetween. Spring 126 exerts a force on piston 120 to urge plunger 122 upwardly. Passage 128 through plunger 122 communicates to chamber 123 behind piston 120 to provide a balancing of pressure forces on piston 120 from the liquid surrounding drum 38 in housing 12. Line 130 is connected to power cylinder 118 to deliver fluid pressure to chamber 131 to urge plunger 122 inwardly and line 132 is connected to cylinder 118 to deliver fluid pressure to chamber 133 to urge plunger 122 outwardly. The inner end of plunger 122 is tapered and coacts with the one of a plurality of recesses 134 which it engages to locate and lock drum 38 in a preselected position. Recesses 134 are in sleeve 80 below groove 100. Each of recesses 134 has an outer tapered opening and within the opening is shaped to fit tightly around the end of plunger 122. The outer taper allows the plunger 122 to turn the drum 38 when forced inwardly with the drum 38 not in the exact position of alignment of tube 46 with one of ports 32. This movement brings the drum 38 into the desired alignment position and locks it in such position.

Figure 6:
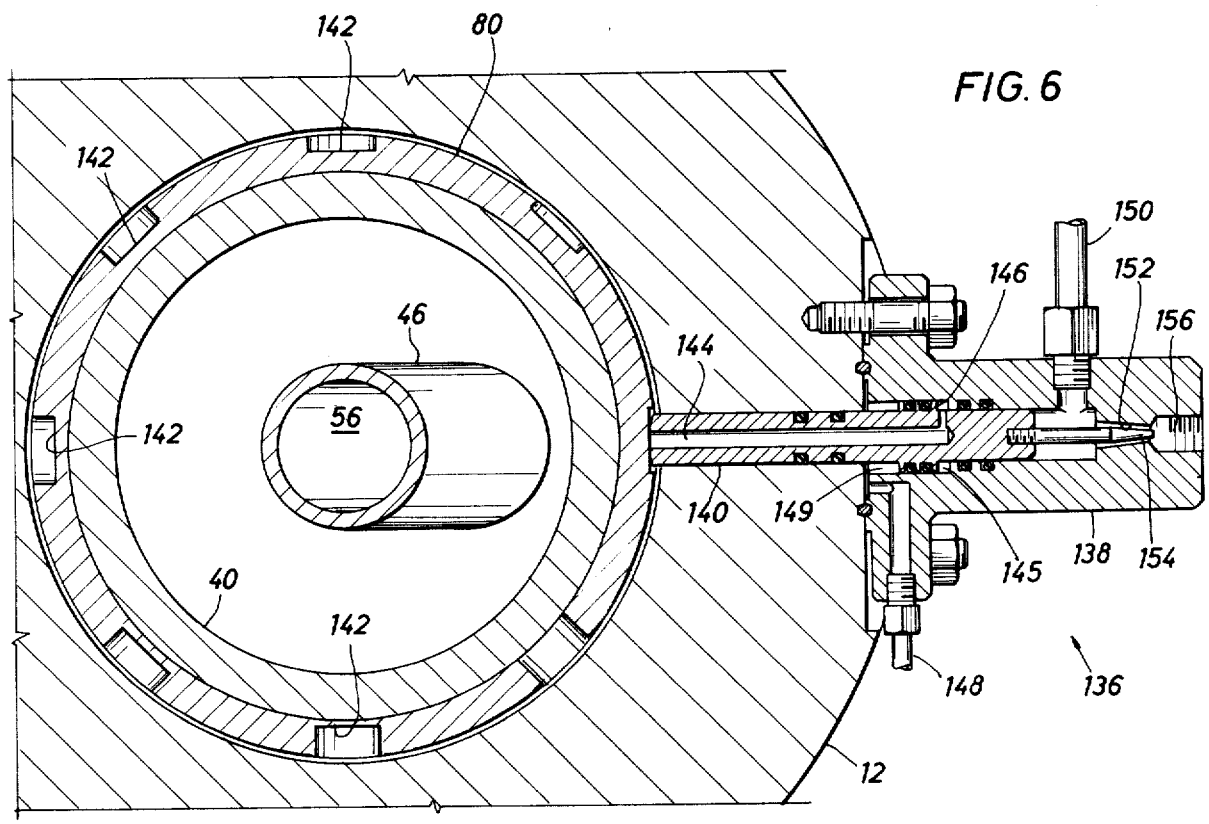
FIG. 6 is a detailed sectional view of the position indicating device taken along line 6—6 in FIG. 1.

Indicator means 136, as best shown in FIG. 6, includes power cylinder 138 mounted on housing 12 and having plunger 140 extending through opening in housing 12 for engagement with the series of recesses 142 in the exterior of sleeve 80 below recesses 134. As shown, each of the recesses 142 has a depth different from the others to provide a means for determining the port 32 with which tube 46 is aligned. Passage 144 extends through plunger 140 and communicates with chamber 145 behind piston 146 to provide a balancing of forces on plunger 140 from pressure in recesses 142. Line 148 connects into chamber 149 within cylinder 138 to exert fluid pressure on the inner side of piston 146 to assure that plunger 140 is normally retracted so that it does not interfere with the rotation of drum 38. Line 150 connects into cylinder 138 to deliver pressure fluid behind plunger 140 to urge it inwardly. Such fluid flows through tapered passage 152, around tapered pin 154 which is secured to and moves with plunger 140 and out line 156. The depth of recesses 142 in which plunger 140 seats determines the position of pin 154 in passage 152 and thus the amount of flow passing therethrough. As hereinafter explained, this flow rate is used to provide an indication with which of ports 32, tube 46 is aligned so that the TFL tools are delivered to their proper location.

Figure 7:
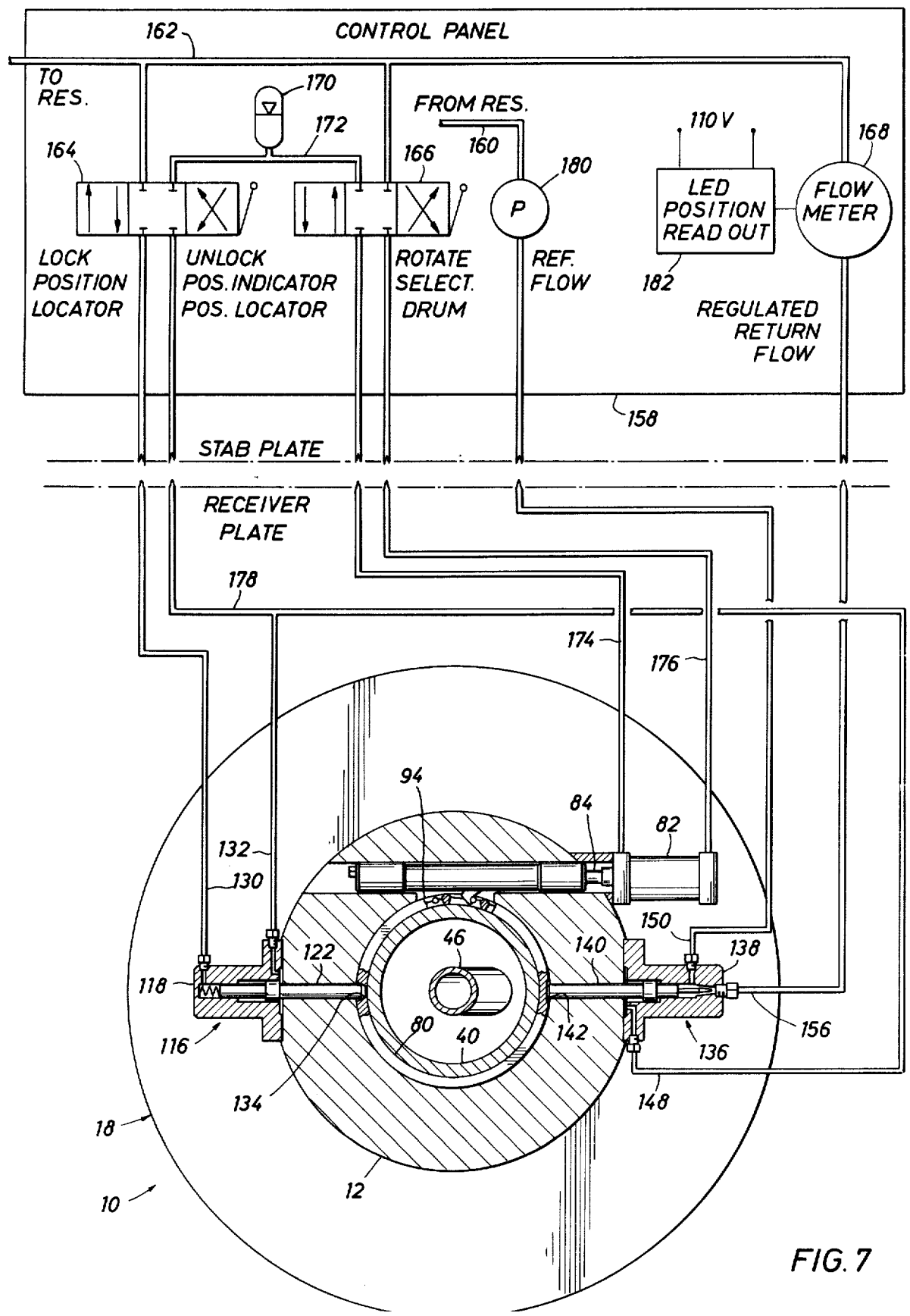
FIG. 7 is a schematic diagram of the hydraulic system used with the present invention with the related apparatus shown schematically.

The operating of improved switching apparatus 10 is controlled by the circuit shown in FIG. 7. The connection of lines from apparatus 10 to control panel 158 is provided by a suitable stab plate and a receiver plate. A reservoir (not shown) supplies hydraulic liquid through line 160 and the return flow is through manifold 162 from valves 164 and 166 and flow meter 168. Accumulator 170 provides a supply of hydraulic liquid under pressure which is delivered through manifold 172 to valves 164 and 166. Suitable means (not shown) is provided to maintain the supply of hydraulic liquid under pressure within accumulator 170. Lines 174 and 176 connect from valve 166 to power cylinder 82 for rotating drum 38. Line 130 is connected to valve 164. Lines 132 and 148 are connected to manifold 178 which connects to valve 164. Line 160 supplies hydraulic liquid to pump 180 which is delivered under constant pressure to line 150 to supply the flow which is restricted by tapered pin 154. The flow leaving cylinder 138 flows through line 156 to flow meter 168. Position read-out indicator 182, which is shown to be an LED device, is connected to flow meter 168 and provides a numerical readout of the number of port 32 with which tube 46 is aligned.

Actuation of switch 166 in one direction causes plunger 84 to extend and in the other direction causes plunger 84 to retract. This cycle rotates drum 38 a preselected amount. It is preferred that this amount be approximately the degree of rotation between ports 32 or a whole fraction thereof such as one-half or one-third so that proper actuation of cylinder 82 rotates drum 38 to the approximate desired position and extension of plunger 122 corrects minor misalignments.

Locator or lock means 116 and indicator means are actuated by moving valve 164 to the left so that pressure is supplied to lines 130 and pressure is vented through lines 132 and 148 allowing plungers 122 and 140 to extend and engage in their respective recesses 134 and 142. When plunger 122 is fully in its recess 134 drum is locked in its aligned position. The entry of plunger 140 in its recess 142 determines the position of pin 154 in passage 152 and thus the flow therethrough which is sensed by flow meter 168 and a position readout or indication provided on panel 158 by indicator 182. Valve 164 is switched to its right position to provide hydraulic pressure to lines 132 and 148 and vent line 130 causing plungers 122 and 140 to retract from their recesses. Thereafter, movement of drum 38 is accomplished by cycling valve 166 as explained.

What is claimed is:
1. A flowline switching apparatus comprising
a tubular housing,
a first end closure secured to one end of said tubular housing having a port extending therethrough,
a second end closure secured to the other end of said tubular housing having a plurality of ports extending therethrough,
a drum within said housing and mounted for rotation therein,
a passage extending through said drum adapted to register with the port in said first end closure and to register in sequence with the ports in said second end closure,
means for rotating said drum,
means for locking said drum in positions of alignment between said passage and each of said ports in said second end closure,
means for indicating the port in the second end closure with which said passage is aligned, and
means for balancing the fluid pressures on interior and exterior of said drum and to minimize the axial loads on said drum responsive to pressures to which the drum is exposed.

2. An apparatus according to claim 1 wherein said rotating means includes
a power cylinder mounted on said housing and having a piston rod extending through and sealed to said housing in generally tangential relation to the exterior of said drum,
ratchet means coacting between said drum and said piston rod to rotate said drum in one direction responsive to movement of said piston rod, said ratchet means including
a ratchet wheel on said drum,
a ratchet detent pivotally mounted on said piston rod,
means for engagement by said ratchet detent on said drum whereby movement of said piston rods in one direction bring said ratchet detent into engagement with said engaging means and movement of said piston rod in the opposite direction disengages said ratchet detent to move said ratchet detent to the next of said engaging means,
said engaging means include
axially extending pins secured to the exterior of said drum, and
cam means for pivoting said ratchet detent away from said engaging means on movement of said piston rod in the opposite direction.

3. An apparatus according to claim 1 wherein said locking means includes
a plurality of recesses in the exterior of said drum,
a power cylinder mounted on said housing and having a plunger extending through said housing in position to engage within the recess in said drum which is aligned with said plunger,
said recesses and said plunger being positioned to lock said drum in each of its positions at which said passage is aligned with one of said ports in said second end closure.

4. An apparatus according to claim 3 including
means balancing the force of the fluids on the inner end of said plunger.

5. An apparatus according to claim 3 including
means biasing said plunger toward engagement with said recesses.

6. An apparatus according to claim 5 including
flow lines connecting to said ports in said second end closure, and
a remotely controlled valve in each of said flow lines to prevent bypassing flow from the aligned port to the other nonaligned ports.

7. An apparatus according to claim 3 including
means for applying pressure to said plunger to force it inward, and
means for applying pressure to said plunger to force it outward.

8. An apparatus according to claim 1 wherein said indicating means includes
a plurality of recesses of varying depths in the exterior of said drum,
a power cylinder mounted on said housing and having a plunger extending through said housing in a position to engage within the recess in said drum which is aligned with said plunger,
an inlet into the outer end of said power cylinder,
an outlet from the outer end of said power cylinder,
a passage extending through said power cylinder between said inlet and outlet and having a tapered restriction portion, a tapered rod secured to said plunger and being within said restriction whereby the position of said rod in said tapered restriction portion controls flow therethrough in relation to the depth of the recess in which said plunger is engaged, and means for measuring the rate of flow through said passage to indicate the part in said second end closure aligned with said drum passage.

9. An apparatus according to claim 1 wherein said pressure balancing means includes liquid filling said drum and said open portions of said housing surrounding said drum, means sealing the exterior from the interior of said drum, a tube secured to said drum with one end exposed to the exterior of the drum and the other end exposed to the interior of said drum, a piston positioned in said tube and adapted to slide therein responsive to changes in fluid pressure to balance the internal and external pressures on said drum, a port in the end of said drum adjacent said first end closure whereby fluid pressures on opposite ends of said drum are balanced, and stop means in the ends of said tube to retain said piston in said tube.

10. A flowline switching apparatus comprising a tubular housing, a first end closure secured to one end of said tubular housing having a port extending therethrough, a second end closure secured to the other end of said tubular housing having a plurality of ports extending therethrough, a drum within said housing and mounted for rotation therein, a passage extending through said drum adapted to register with the port in said first end closure and to register in sequence with the ports in said second end closure, means for rotating said drum, means for indicating the port in the second end closure with which said passage is aligned, means for locking said drum in positions of alignment between said passage and each of said ports in said second end closure, said locking means including a plurality of recesses in the exterior of said drum, and a power cylinder mounted on said housing and having a plunger extending through said housing in position to engage within the recess in said drum which is aligned with said plunger, said recesses and said plunger being positioned to lock said drum in each of its positions at which said passage is aligned with one of said ports in said second end closure.

11. A flowline switching apparatus comprising a tubular housing, a first end closure secured to one end of said tubular housing having a port extending therethrough, a second end closure secured to the other end of said tubular housing having a plurality of ports extending therethrough, a drum within said housing and mounted for rotation therein, a passage extending through said drum adapted to register with the port in said first end closure and to register in sequence with the ports in said second end closure, means for rotating said drum, means for locking said drum in positions of alignment between said passage and each of said ports in said second end closure, means for indicating the port in the second end closure with which said passage is aligned, said indicating means including a plurality of recesses of varying depths in the exterior of said drum, a power cylinder mounted on said housing and having a plunger extending through said housing in a position to engage within the recess in said drum which is aligned with said plunger, an inlet into the outer end of said power cylinder, an outlet from the outer end of said power cylinder, a passage extending through said power cylinder between said inlet and outlet and having a tapered restriction portion, a tapered rod secured to said plunger and being within said restriction whereby the position of said rod in said tapered restriction portion controls flow therethrough in relation to the depth of the recess in which said plunger is engaged, and means for measuring the rate of flow through said passage to indicate the part in said second end closure aligned with said drum passage.

* * * * *